(12) United States Patent
Mock et al.

(10) Patent No.: US 12,000,464 B1
(45) Date of Patent: Jun. 4, 2024

(54) MULTI-SPEED PLANETARY TRANSMISSION

(71) Applicant: Allison Transmission, Inc., Indianapolis, IN (US)

(72) Inventors: Isaac Mock, Martinsville, IN (US); Michael Rietdorf, Brownsburg, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/236,752

(22) Filed: Aug. 22, 2023

(51) Int. Cl.
*F16H 3/62* (2006.01)
*F16H 57/02* (2012.01)

(52) U.S. Cl.
CPC .............. *F16H 3/62* (2013.01); *F16H 57/02* (2013.01); *F16H 2057/02043* (2013.01); *F16H 2200/006* (2013.01); *F16H 2200/0065* (2013.01); *F16H 2200/0095* (2013.01); *F16H 2200/2015* (2013.01); *F16H 2200/2048* (2013.01)

(58) Field of Classification Search
CPC .......... F16H 2200/2015–2017; F16H 2200/2043–2061; F16H 3/62–3/66; F16H 2200/0065–0078
See application file for complete search history.

(56) References Cited

U.S. PATENT DOCUMENTS

| 3,815,445 A * | 6/1974 | Gorrell | F16H 3/666 475/290 |
|---|---|---|---|
| 4,070,927 A | 1/1978 | Polak | |
| 4,228,697 A | 10/1980 | Miller | |
| 4,420,992 A * | 12/1983 | Windish | F16H 3/66 475/280 |
| 7,285,069 B2 | 10/2007 | Klemen | |
| 8,002,662 B2 | 8/2011 | Phillips et al. | |
| 8,801,562 B2 | 8/2014 | Etchason | |
| 2005/0113205 A1 | 5/2005 | Oguri et al. | |
| 2008/0137050 A1 * | 6/2008 | Ivanov | H05G 2/003 355/53 |
| 2009/0305838 A1 | 12/2009 | Borgerson et al. | |
| 2010/0184554 A1 * | 7/2010 | Shiohara | F16H 3/666 475/275 |
| 2010/0240488 A1 | 9/2010 | Carey et al. | |
| 2013/0157796 A1 | 6/2013 | Etchason | |

(Continued)

FOREIGN PATENT DOCUMENTS

| CN | 206246613 U | 6/2017 |
|---|---|---|
| CN | 112984059 B | 10/2021 |

(Continued)

*Primary Examiner* — David R Morris
*Assistant Examiner* — Lillian T Nguyen
(74) *Attorney, Agent, or Firm* — Faegre Drinker Biddle & Reath LLP

(57) ABSTRACT

A multi-speed transmission may include a plurality of planetary gearsets and a plurality of selective couplers. The plurality of planetary gearsets may include a first planetary gearset, a second planetary gearset, a third planetary gearset, a fourth planetary gearset, and a fifth planetary gearset. The plurality of selective couplers may include a number of clutches and a number of brakes. The multi-speed transmission may have five planetary gearsets and seven selective couplers. The seven selective couplers may include two clutches and five brakes or three clutches and three brakes.

13 Claims, 4 Drawing Sheets

(56) References Cited

U.S. PATENT DOCUMENTS

2023/0088352 A1      3/2023   Patel et al.
2023/0358297 A1*   11/2023   Patel ........................ F16H 3/66

FOREIGN PATENT DOCUMENTS

| CN | 113108032 B | 4/2022 |
| CN | 115217919 A | 10/2022 |
| EP | 2167843 B1 | 9/2011 |
| FR | 2706010 A1 | 12/1994 |
| KR | 100298742 B1 | 11/2001 |
| WO | 2011026833 A1 | 3/2011 |

* cited by examiner

| Range | Ratio | 162 | 164 | 166 | 168 | 170 | 172 | 174 |
|---|---|---|---|---|---|---|---|---|
| 1st | 7.83 | X | | | | | | X |
| 2nd | 5.14 | X | | | | | X | |
| 3rd | 3.51 | X | | | | X | | |
| 4th | 1.99 | X | | | X | | | |
| 5th | 1.46 | X | | X | | | | |
| 6th | 1.00 | X | X | | | | | |
| 7th | 0.71 | | X | X | | | | |
| 8th | 0.60 | | X | | X | | | |
| R1 | -15.97 | | | X | | | | X |
| R2 | -8.61 | | | X | | | X | |
| R3 | -4.15 | | | X | | X | | |
| R4 | -1.72 | | X | | | | | X |
| R5 | -0.65 | | X | | | | X | |

"X" = ENGAGED CONFIGURATION
"BLANK" = DISENGAGED CONFIGURATION

FIG. 2

| Range | Ratio | 362 | 364 | 366 | 368 | 370 | 372 | 374 |
|---|---|---|---|---|---|---|---|---|
| 1st | 7.83 | X | | | | | | X |
| 2nd | 3.51 | X | | | | X | | |
| 3rd | 2.61 | X | | | | | X | |
| 4th | 1.91 | X | | | X | | | |
| 5th | 1.43 | X | | X | | | | |
| 6th | 1.00 | X | X | | | | | |
| 7th | 0.74 | | X | X | | | | |
| 8th | 0.64 | | X | | X | | | |
| 9th | 0.36 | | X | | | | X | |
| R1 | -16.38 | | | X | | | | X |
| R2 | -4.80 | | | X | | X | | |
| R3 | -2.11 | | | X | | | X | |
| R4 | -1.54 | | X | | | | | X |

"X" = ENGAGED CONFIGURATION
"BLANK" = DISENGAGED CONFIGURATION

FIG. 4

MULTI-SPEED PLANETARY TRANSMISSION

FIELD OF THE DISCLOSURE

The present disclosure relates to a multi-speed transmission and in particular to a multi-speed transmission including a plurality of planetary gearsets and a plurality of selective couplers to achieve a plurality of forward speed ratios and a plurality of reverse speed ratios.

BACKGROUND OF THE DISCLOSURE

Multi-speed transmissions use a plurality of planetary gearsets, selective couplers, interconnectors, and additional elements to achieve a plurality of forward and reverse speed ratios. An exemplary multi-speed transmission is disclosed in U.S. Pat. No. 4,070,927, the entire disclosure of which is expressly incorporated by reference herein.

SUMMARY

The present disclosure provides a multi-speed transmission including a plurality of planetary gearsets and a plurality of selective couplers to achieve at least nine forward speed ratios. The plurality of planetary gearsets may include a first planetary gearset, a second planetary gearset, a third planetary gearset, a fourth planetary gearset, and a fifth planetary gearset. The plurality of selective couplers may include a number of clutches and a number of brakes. In one example, the present disclosure provides a multi-speed transmission having five planetary gearsets and seven selective couplers. The seven selective couplers may include two clutches and five brakes. The two clutches may be directly coupled to an input member.

In some instances throughout this disclosure and in the claims, numeric terminology, such as first, second, third, fourth, fifth, sixth, and seventh, is used in reference to various gearsets, gears, gearset components, interconnectors, selective couplers, and other components. Such use is not intended to denote an ordering of the components. Rather, numeric terminology is used to assist the reader in identifying the component being referenced and should not be narrowly interpreted as providing a specific order of components. For example, a first planetary gearset identified in the drawings may support any one of the plurality of planetary gearsets recited in the claims, including the first planetary gearset, the second planetary gearset, the third planetary gearset, the fourth planetary gearset, and the fifth planetary gearset, depending on the language of the claims.

In an exemplary embodiment of the present disclosure a transmission is provided. The transmission comprising: at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets including a first gearset component, a second gearset component, and a third gearset component. The plurality of planetary gearsets including a first planetary gearset, a second planetary gearset, a third planetary gearset, a fourth planetary gearset, and a fifth planetary gearset. The input member is fixedly coupled to the first gearset component of the first planetary gearset. The output member is fixedly coupled to the second gearset component of the third planetary gearset, the first gearset component of the fourth planetary gearset, and the first gearset component of the fifth planetary gearset. The transmission further comprising a first interconnector which fixedly couples the second gearset component of the second planetary gearset, the third gearset component of the third planetary gearset, and the third gearset component of the fourth planetary gearset together; a second interconnector which fixedly couples the third gearset component of the second planetary gearset and the second gearset component of the first planetary gearset together; a third interconnector which fixedly couples the second gearset component of the fourth planetary gearset and the third gearset component of the fifth planetary gearset together; a fourth interconnector which fixedly couples the first gearset component of the second planetary gearset and the first gearset component of the third planetary gearset together; and a plurality of selective couplers. The plurality of selective couplers includes a first selective coupler which, when engaged, fixedly couples the input member and the first gearset component of the first planetary gearset to the first gearset component of the second planetary gearset and the first gearset component of the third planetary gearset; a second selective coupler which, when engaged, fixedly couples the input member and the first gearset component of the first planetary gearset to the second gearset component of the second planetary gearset, the third gearset component of the third planetary gearset, and the third gearset component of the fourth planetary gearset; a third selective coupler which, when engaged, fixedly couples the third gearset component of the first planetary gearset to the at least one stationary member; a fourth selective coupler which, when engaged, fixedly couples the second gearset component of the first planetary gearset and the third gearset component of the second planetary gearset to the at least one stationary member; a fifth selective coupler which, when engaged, fixedly couples the second gearset component of the second planetary gearset, the third gearset component of the third planetary gearset, and the third gearset component of the fourth planetary gearset to the at least one stationary member; a sixth selective coupler which, when engaged, fixedly couples the second gearset component of the fourth planetary gearset and the third gearset component of the fifth planetary gearset to the at least one stationary member; and a seventh selective coupler which, when engaged, fixedly couples the second gearset component of the fifth planetary gearset to the at least one stationary member.

In an example thereof, the at least one stationary member includes a housing. The housing having a first end and a second end. The input member is accessible proximate the first end of the housing. The output member is accessible proximate the second end of the housing. The first planetary gearset is positioned between the first end of the housing and the second planetary gearset. The second planetary gearset is positioned between the first planetary gearset and the third planetary gearset. The third planetary gearset is positioned between the second planetary gearset and the fourth planetary gearset. The fourth planetary gearset is positioned between the third planetary gearset and the fifth planetary gearset. The fifth planetary gearset is positioned between the fourth planetary gearset and the second end of the housing.

In another example thereof, each of the first planetary gearset, the second planetary gearset, the third planetary gearset, the fourth planetary gearset, the fifth planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier, the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

In still another example thereof, the plurality of selective couplers are selectively engaged in a plurality of combinations to establish a plurality of forward speed ratios and a plurality of reverse speed ratios between the input member and the output member, each of the plurality of combinations having at least two of the plurality of selective couplers engaged. In a variation thereof, in each combination only two of the plurality of selective couplers are engaged In a further example thereof, the plurality of selective couplers are selectively engaged to establish: a first forward speed ratio wherein the first selective coupler and the seventh selective coupler are engaged; a second forward speed ratio wherein the first selective coupler and the sixth selective coupler are engaged; a third forward speed ratio wherein the first selective coupler and the fifth selective coupler are engaged; a fourth forward speed ratio wherein the first selective coupler and the fourth selective coupler are engaged; a fifth forward speed ratio wherein the first selective coupler and the third selective coupler are engaged; a sixth forward speed ratio wherein the first selective coupler and the second selective coupler are engaged; a seventh forward speed ratio wherein the second selective coupler and the third selective coupler are engaged; an eighth forward speed ratio wherein the second selective coupler and the fourth selective coupler are engaged; a first reverse speed ratio wherein the third selective coupler and the seventh selective coupler are engaged; a second reverse speed ratio wherein the third selective coupler and the sixth selective coupler are engaged; a third reverse speed ratio wherein the third selective coupler and the fifth selective coupler are engaged; a fourth reverse speed ratio wherein the second selective coupler and the seventh selective coupler are engaged; and a fifth reverse speed ratio wherein the second selective coupler and the sixth selective coupler are engaged.

In another exemplary embodiment of the present disclosure, a transmission is provided. The transmission comprising: at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets including a first gearset component, a second gearset component, and a third gearset component. The plurality of planetary gearsets including a first planetary gearset, a second planetary gearset, a third planetary gearset, a fourth planetary gearset, and a fifth planetary gearset. The input member is fixedly coupled to the first gearset component of the first planetary gearset. The output member is fixedly coupled to the second gearset component of the third planetary gearset, the first gearset component of the fourth planetary gearset, and the third gearset component of the fifth planetary gearset. The transmission further comprising a first interconnector which fixedly couples the third gearset component of the second planetary gearset and the second gearset component of the first planetary gearset together; a second interconnector which fixedly couples the second gearset component of the second planetary gearset, the third gearset component of the third planetary gearset, the second gearset component of the fourth planetary gearset, and the first gearset component of the fifth planetary gearset together; a third interconnector which fixedly couples the first gearset component of the second planetary gearset and the first gearset component of the third planetary gearset together; and a plurality of selective couplers. The plurality of selective couplers includes a first selective coupler which, when engaged, fixedly couples the input member and the first gearset component of the first planetary gearset to the first gearset component of the second planetary gearset and the first gearset component of the third planetary gearset; a second selective coupler which, when engaged, fixedly couples the input member and the first gearset component of the first planetary gearset to the second gearset component of the second planetary gearset, the third gearset component of the third planetary gearset, the second gearset component of the fourth planetary gearset, and the first gearset component of the fifth planetary gearset; a third selective coupler which, when engaged, fixedly couples the third gearset component of the first planetary gearset to the at least one stationary member; a fourth selective coupler which, when engaged, fixedly couples the second gearset component of the first planetary gearset and the third gearset component of the second planetary gearset to the at least one stationary member; a fifth selective coupler which, when engaged, fixedly couples the second gearset component of the second planetary gearset, the third gearset component of the third planetary gearset, the second gearset component of the fourth planetary gearset, and the first gearset component of the fifth planetary gearset to the at least one stationary member; a sixth selective coupler which, when engaged, fixedly couples the third gearset component of the fourth planetary gearset to the at least one stationary member; and a seventh selective coupler which, when engaged, fixedly couples the second gearset component of the fifth planetary gearset to the at least one stationary member.

In an example thereof, the at least one stationary member includes a housing. The housing having a first end and a second end. The input member is accessible proximate the first end of the housing. The output member is accessible proximate the second end of the housing. The first planetary gearset is positioned between the first end of the housing and the second planetary gearset. The second planetary gearset is positioned between the first planetary gearset and the third planetary gearset. The third planetary gearset is positioned between the second planetary gearset and the fourth planetary gearset. The fourth planetary gearset is positioned between the third planetary gearset and the fifth planetary gearset. The fifth planetary gearset is positioned between the fourth planetary gearset and the second end of the housing.

In another example thereof, each of the first planetary gearset, the second planetary gearset, the third planetary gearset, the fourth planetary gearset, the fifth planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier, the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

In a further example thereof, the plurality of selective couplers are selectively engaged in a plurality of combinations to establish a plurality of forward speed ratios and a plurality of reverse speed ratios between the input member and the output member, each of the plurality of combinations having at least two of the plurality of selective couplers engaged. In a variation thereof, in each combination only two of the plurality of selective couplers are engaged In still a further example thereof, the plurality of selective couplers are selectively engaged to establish: a first forward speed ratio wherein the first selective coupler and the seventh selective coupler are engaged; a second forward speed ratio wherein the first selective coupler and the fifth selective coupler are engaged; a third forward speed ratio wherein the first selective coupler and the sixth selective coupler are engaged; a fourth forward speed ratio wherein the first selective coupler and the fourth selective coupler are engaged; a fifth forward speed ratio wherein the first selective coupler and the third selective coupler are engaged; a sixth forward speed ratio wherein the first selective coupler and the second selective coupler are engaged; a seventh forward speed ratio wherein the second selective coupler and the third selective coupler are engaged; an eighth forward speed ratio wherein the second selective coupler and the fourth selective coupler are engaged; a ninth forward speed ratio wherein the second selective coupler and the sixth selective coupler are engaged; a first reverse speed ratio wherein the third selective coupler and the seventh selective coupler are engaged; a second reverse speed ratio wherein the third selective coupler and the fifth selective coupler are engaged; a third reverse speed ratio wherein the third selective coupler and the sixth selective coupler are engaged; and a fourth reverse speed ratio wherein the second selective coupler and the seventh selective coupler are engaged.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 2 is a truth table illustrating the selective engagement of the seven selective couplers of FIG. 1 to provide eight forward gear or speed ratios and five reverse gear or speed ratios of the multi-speed transmission of FIG. 1;

FIG. 4 is a truth table illustrating the selective engagement of the seven selective couplers of FIG. 3 to provide nine forward gear or speed ratios and four reverse gear or speed ratios of the multi-speed transmission of FIG. 3.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
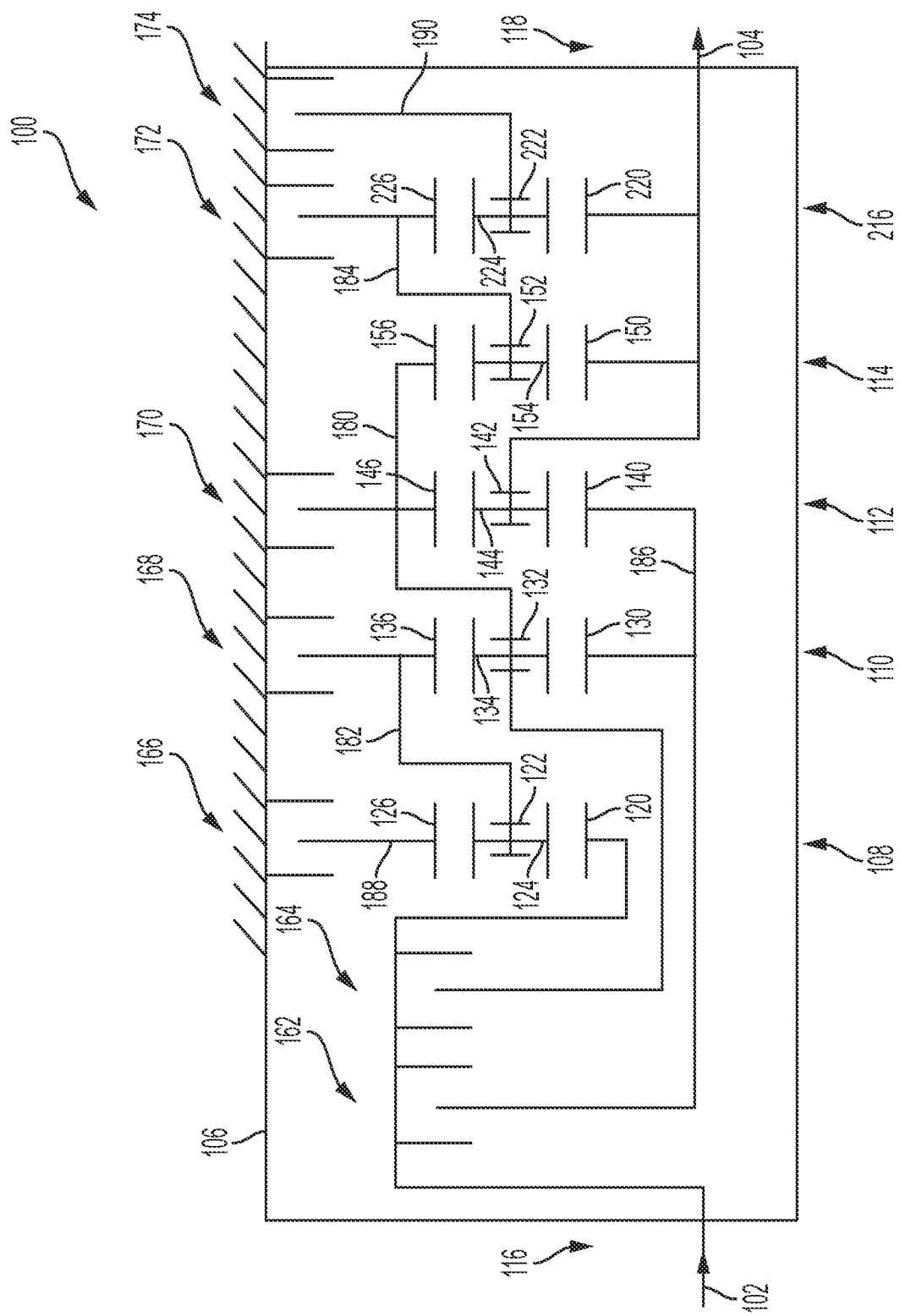
FIG. 1 is a diagrammatic view of an exemplary multi-speed transmission including five planetary gearsets and seven selective couplers.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In the illustrated transmission embodiments, selective couplers are disclosed. A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in t U.S. Pat. No. 10,024,394, the entire disclosure of which is incorporated by reference herein.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

The disclosed transmission embodiments include a plurality of planetary gearsets. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn engaged with the teeth of the ring gear. Each of these components may also be referred to as a gearset component. It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier.

One or more rotating components, such as shafts, drums, and other components, may be collectively referred to as an interconnector when the one or more components are fixedly coupled together. Interconnectors may further be fixedly coupled to one or more gearset components and/or one or more selective couplers.

An input member of the disclosed transmission embodiments is rotated by a prime mover. An exemplary input member is a shaft or other rotatable component which may be operatively coupled to the prime mover. Exemplary prime movers include internal combustion engines, electric motors, hybrid power systems, and other suitable power systems. In one embodiment, the prime mover indirectly rotates the input member through a clutch and/or a torque converter. An output member of the disclosed transmission embodiments provides rotational power to one or more working components. An exemplary output member is a shaft or other rotatable component which may be operatively coupled to the working component. Exemplary working components include one or more drive wheels of a motor vehicle, a power take-off shaft, and other suitable devices. The output member is rotated based on the interconnections of the gearset components and the selective couplers of the transmission. By changing the interconnections of the gearset components and the selective couplers, a rotation speed and/or direction of the output member may be varied from a rotation speed and/or direction of the input member.

The disclosed transmission embodiments are capable of transferring torque from the input member to the output member and rotating the output member in at least eight forward gear or speed ratios relative to the input member and five reverse gear or speed ratios. Illustratively nine forward gear or speed ratios and four reverse gear or speed ratios are possible for some embodiments. Exemplary gear ratios that may be obtained using the embodiments of the present disclosure are disclosed herein. Of course, other gear ratios are achievable depending on the characteristics of the gearsets utilized. Exemplary characteristics include respective gear diameters, the number of gear teeth, and the configurations of the various gears.

FIG. 1 is a diagrammatic representation of a multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component. An exemplary output member 104 is an output shaft or other suitable rotatable component. An exemplary stationary member 106 is a housing of multi-speed transmission 100. The housing may include several components coupled together.

Multi-speed transmission 100 includes a plurality of planetary gearsets, illustratively a first planetary gearset 108, a second planetary gearset 110, a third planetary gearset 112, a fourth planetary gearset 114, and a fifth planetary gearset 216. In one embodiment, additional planetary gearsets may be included. Further, although first planetary gearset 108, second planetary gearset 110, third planetary gearset 112, fourth planetary gearset 114, and fifth planetary gearset 216 are illustrated as simple planetary gearsets, it is contemplated that compound planetary gearsets may be included in some embodiments.

In one embodiment, multi-speed transmission 100 is arranged as illustrated in FIG. 1, with first planetary gearset 108 positioned between a first location or end 116 at which input member 102 enters stationary member 106 and second planetary gearset 110, second planetary gearset 110 is positioned between first planetary gearset 108 and third planetary gearset 112, third planetary gearset 112 is positioned between second planetary gearset 110 and fourth planetary gearset 114, fourth planetary gearset 114 is positioned between third planetary gearset 112 and fifth planetary gearset 216, and fifth planetary gearset 216 is positioned between fourth planetary gearset 114 and a second location or end 118 at which output member 104 exits stationary member 106. In alternative embodiments, first planetary gearset 108, second planetary gearset 110, third planetary gearset 112, fourth planetary gearset 114, and fifth planetary gearset 216 are arranged in any order relative to location 116 and location 118. In the illustrated embodiment of FIG. 1, each of first planetary gearset 108, second planetary gearset 110, third planetary gearset 112, fourth planetary gearset 114, and fifth planetary gearset 216 are axially aligned. In one example, input member 102 and output member 104 are also axially aligned with first planetary gearset 108, second planetary gearset 110, third planetary gearset 112, fourth planetary gearset 114, and fifth planetary gearset 216. In alternative embodiments, one or more of input member 102, output member 104, first planetary gearset 108, second planetary gearset 110, third planetary gearset 112, fourth planetary gearset 114, and fifth planetary gearset 216 are offset and not axially aligned with the remainder.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156. Fifth planetary gearset 216 includes a sun gear 220, a planet carrier 222 supporting a plurality of planet gears 224, and a ring gear 226.

Multi-speed transmission 100 further includes a plurality of selective couplers, illustratively a first selective coupler 162, a second selective coupler 164, a third selective coupler 166, a fourth selective coupler 168, a fifth selective coupler 170, a sixth selective coupler 172, and a seventh selective coupler 174. In the illustrated embodiment, first selective coupler 162 and second selective coupler 164 are clutches and third selective coupler 166, fourth selective coupler 168, fifth selective coupler 170, sixth selective coupler 172, and seventh selective coupler 174 are brakes. The axial locations of the clutches and brakes relative to the plurality of planetary gearsets may be altered from the illustrated axial locations. In alternative embodiments, any number of clutches and brakes may be used.

Multi-speed transmission 100 includes several components that are illustratively shown as being fixedly coupled together. Input member 102 is fixedly coupled to sun gear 120 of first planetary gearset 108. Output member 104 is fixedly coupled to planet carrier 142 of third planetary gearset 112, sun gear 150 of fourth planetary gearset 114, and sun gear 220 of fifth planetary gearset 216. Sun gear 120 of first planetary gearset 108 is fixedly coupled to sun gear 140 of 110. Planet carrier 122 of first planetary gearset 108 is fixedly coupled to ring gear 136 of second planetary gearset 110. Ring gear 146 of third planetary gearset 112, ring gear 156 of fourth planetary gearset 114, and planet carrier 132 of second planetary gearset 110 are fixedly coupled together. Planet carrier 122 of first planetary gearset 108 is fixedly coupled to ring gear 136 of second planetary gearset 110. Planet carrier 152 of fourth planetary gearset 114 is fixedly coupled to ring gear 226 of fifth planetary gearset 216. In alternative embodiments, one or more of the components fixedly coupled together are selectively coupled together through one or more selective couplers.

Multi-speed transmission 100 may be described as having eight interconnectors. Input member 102 is a first interconnector that both provides input torque to multi-speed transmission 100 and is fixedly coupled to sun gear 120 of first planetary gearset 108. Input member 102 is further fixedly connected to first selective coupler 162 and second selective coupler 164. Output member 104 is a second interconnector that both provides output torque from multi-speed transmission 100 and fixedly couples planet carrier 142 of third planetary gearset 112, sun gear 150 of fourth planetary gearset 114, and sun gear 220 of fifth planetary gearset 216. A third interconnector 180 fixedly couples ring gear 146 of third planetary gearset 112, ring gear 156 of fourth planetary gearset 114, and planet carrier 132 of second planetary gearset 110 together. Third interconnector 180 is further fixedly coupled to second selective coupler 164 and fifth selective coupler 170. A fourth interconnector 182 fixedly couples planet carrier 122 of the first planetary gearset 108 to ring gear 136 of the second planetary gearset 110 together. Fourth interconnector 182 is further fixedly coupled to fourth selective coupler 168. A fifth interconnector 184 fixedly couples planet carrier 154 of the fourth planetary gearset 114 and ring gear 226 of the fifth planetary gearset 216 together. Fifth interconnector 184 is further fixedly coupled to sixth selective coupler 172. A sixth interconnector 186 fixedly couples sun gear 130 of the second planetary gearset 110 and sun gear 140 of the third planetary gearset 112 together. Sixth interconnector 186 is further fixedly coupled to first selective coupler 162. A seventh interconnector 188 fixedly couples ring gear 126 of first planetary gearset 108 to third selective coupler 166. An eighth interconnector 190 fixedly couples planet carrier 222 of fifth planetary gearset 216 to seventh selective coupler 174.

Multi-speed transmission 100 further includes several components that are illustratively shown as being selectively coupled together through selective couplers. First selective coupler 162, when engaged, fixedly couples sun gear 120 of the first planetary gearset 108 to sun gear 130 of the second planetary gearset 110 and sun gear 140 of the third planetary gearset 112. When first selective coupler 162 is disengaged, sun gear 120 of the first planetary gearset 108 may rotate relative to sun gear 130 of the second planetary gearset 110 and sun gear 140 of the third planetary gearset 112.

Second selective coupler 164, when engaged, fixedly couples sun gear 120 of the first planetary gearset 108 to planet carrier 132 of second planetary gearset 110, ring gear 146 of the third planetary gearset 112, and ring gear 156 of the fourth planetary gearset 114. When second selective coupler 164 is disengaged, sun gear 120 of the first planetary gearset 108 may rotate relative to planet carrier 132 of second planetary gearset 110, ring gear 146 of the third planetary gearset 112, and ring gear 156 of the fourth planetary gearset 114.

Third selective coupler 166, when engaged, fixedly couples ring gear 126 of the first planetary gearset 108 to stationary member 106. When third selective coupler 166 is disengaged, ring gear 126 of the first planetary gearset 108 may rotate relative to stationary member 106.

Fourth selective coupler 168, when engaged, fixedly couples planet carrier 122 of the first planetary gearset 108 and ring gear 136 of the second planetary gearset 110 to stationary member 106. When fourth selective coupler 168 is disengaged, planet carrier 122 of the first planetary gearset 108 and ring gear 136 of the second planetary gearset 110 may rotate relative to stationary member 106.

Fifth selective coupler 170, when engaged, fixedly couples planet carrier 132 of the second planetary gearset 110, ring gear 146 of the third planetary gearset 112, and ring gear 156 of the fourth planetary gearset 114 to stationary member 106. When fifth selective coupler 170 is disengaged, planet carrier 132 of the second planetary gearset 110, ring gear 146 of the third planetary gearset 112, and ring gear 156 of the fourth planetary gearset 114 may rotate relative to stationary member 106.

Sixth selective coupler 172, when engaged, fixedly couples planet carrier 152 of the fourth planetary gearset 114 and ring gear 226 of the fifth planetary gearset 216 to stationary member 106. When sixth selective coupler 172 is disengaged, planet carrier 152 of the fourth planetary gearset 114 and ring gear 226 of the fifth planetary gearset 216 may rotate relative to stationary member 106.

Seventh selective coupler 174, when engaged, fixedly couples planet carrier 222 of the fifth planetary gearset 216 to stationary member 106. When seventh selective coupler 174 is disengaged, planet carrier 222 of the fifth planetary gearset 216 may rotate relative to stationary member 106.

By engaging various combinations of first selective coupler 162, second selective coupler 164, third selective coupler 166, fourth selective coupler 168, fifth selective coupler 170, sixth selective coupler 172, and seventh selective coupler 174, additional components of multi-speed transmission 100 may be fixedly coupled together.

The plurality of planetary gearsets and the plurality of selective couplers of multi-speed transmission 100 may be interconnected in various arrangements to provide torque from input member 102 to output member 104 in at least eight forward gear or speed ratios and at least five reverse gear or speed ratios. Referring to FIG. 2, an exemplary truth table 200 is shown that provides the state of each of first selective coupler 162, second selective coupler 164, third selective coupler 166, fourth selective coupler 168, fifth selective coupler 170, sixth selective coupler 172, and seventh selective coupler 174 for eight different forward gear or speed ratios and five reverse gear or speed ratios. Each row corresponds to a given interconnection arrangement for multi-speed transmission 100. The first column provides the gear range. The second column an exemplary gear ratio of multi-speed transmission 100. The remaining columns illustrate which ones of the selective couplers 162-174 are engaged ("X" indicates engaged) and which ones of selective couplers 162-174 are disengaged ("(blank)" indicates disengaged). FIG. 2 is only one example of any number of truth tables possible for achieving at least eight forward ratios and at least five reverse ratios.

In the example of FIG. 2, to place multi-speed transmission 100 in neutral (Neu), all of first selective coupler 162, second selective coupler 164, third selective coupler 166, fourth selective coupler 168, fifth selective coupler 170, sixth selective coupler 172, and seventh selective coupler 174 are in the disengaged configuration. One or more of first selective coupler 162, second selective coupler 164, third selective coupler 166, fourth selective coupler 168, fifth selective coupler 170, sixth selective coupler 172, and seventh selective coupler 174 may remain engaged in neutral (Neu) as long as the combination of first selective coupler 162, second selective coupler 164, third selective coupler 166, fourth selective coupler 168, fifth selective coupler 170, sixth selective coupler 172, and seventh selective coupler 174 does not transmit torque from input member 102 to output member 104.

A first forward ratio (shown as 1st) in truth table 200 of FIG. 2 is achieved by having first selective coupler 162 and seventh selective coupler 174 in an engaged configuration and second selective coupler 164, third selective coupler 166, fourth selective coupler 168, fifth selective coupler 170, and sixth selective coupler 172 in a disengaged configuration.

A second or subsequent forward ratio (shown as 2nd) in truth table 200 of FIG. 2 is achieved by having first selective coupler 162 and sixth selective coupler 172 in an engaged configuration and second selective coupler 164, third selective coupler 166, fourth selective coupler 168, fifth selective coupler 170, and seventh selective coupler 174 in a disengaged configuration. Therefore, when transitioning between the first forward ratio and the second forward ratio, seventh selective coupler 174 is placed in the disengaged configuration and sixth selective coupler 172 is placed in the engaged configuration.

A third or subsequent forward ratio (shown as 3rd) in truth table 200 of FIG. 2 is achieved by having first selective coupler 162 and fifth selective coupler 170 in an engaged configuration and second selective coupler 164, third selective coupler 166, fourth selective coupler 168, sixth selective coupler 172, and seventh selective coupler 174 in a disengaged configuration. Therefore, when transitioning between the second forward ratio and the third forward ratio, sixth selective coupler 172 is placed in the disengaged configuration and fifth selective coupler 170 is placed in the engaged configuration.

A fourth or subsequent forward ratio (shown as 4th) in truth table 200 of FIG. 2 is achieved by having first selective coupler 162 and fourth selective coupler 168 in an engaged configuration and second selective coupler 164, third selective coupler 166, fifth selective coupler 170, sixth selective coupler 172, and seventh selective coupler 174 in a disengaged configuration. Therefore, when transitioning between the third forward ratio and the fourth forward ratio, fifth selective coupler 170 is placed in the disengaged configuration and fourth selective coupler 168 is placed in the engaged configuration.

A fifth or subsequent forward ratio (shown as 5th) in truth table 200 of FIG. 2 is achieved by having first selective coupler 162 and third selective coupler 166 in an engaged configuration and second selective coupler 164, fourth selective coupler 168, fifth selective coupler 170, sixth selective coupler 172, and seventh selective coupler 174 in a disengaged configuration. Therefore, when transitioning between the fourth forward ratio and the fifth forward ratio, fourth selective coupler 168 is placed in the disengaged configuration and third selective coupler 166 is placed in the engaged configuration.

A sixth or subsequent forward ratio (shown as 6th) in truth table 200 of FIG. 2 is achieved by having first selective coupler 162 and second selective coupler 164 in an engaged configuration and third selective coupler 166, fourth selective coupler 168, fifth selective coupler 170, sixth selective coupler 172, and seventh selective coupler 174 in a disengaged configuration. Therefore, when transitioning between the fifth forward ratio and the sixth forward ratio, third selective coupler 166 is placed in the disengaged configuration and second selective coupler 164 is placed in the engaged configuration.

A seventh or subsequent forward ratio (shown as 7th) in truth table 200 of FIG. 2 is achieved by having second selective coupler 164 and third selective coupler 166 in an engaged configuration and first selective coupler 162, fourth selective coupler 168, fifth selective coupler 170, sixth selective coupler 172, and seventh selective coupler 174 in a disengaged configuration. Therefore, when transitioning between the sixth forward ratio and the seventh forward ratio, first selective coupler 162 is placed in the disengaged configuration and third selective coupler 166 is placed in the engaged configuration.

An eighth or subsequent forward ratio (shown as 8th) in truth table 200 of FIG. 2 is achieved by having second selective coupler 164 and fourth selective coupler 168 in an engaged configuration and first selective coupler 162, third selective coupler 166, fifth selective coupler 170, sixth selective coupler 172, and seventh selective coupler 174 in a disengaged configuration. Therefore, when transitioning between the seventh forward ratio and the eighth forward ratio, third selective coupler 166 is placed in the disengaged configuration and fourth selective coupler 168 is placed in the engaged configuration.

The present disclosure contemplates that downshifts follow the reverse sequence of the corresponding upshift (as described above). Further, several power-on skip-shifts that are single-transition are possible (e.g. from 1st up to 3rd, from 3rd down to 1st, from 3rd up to 5th, and from 5th down to 3rd).

A first reverse gear or speed ratio (shown as R1) in exemplary truth table 200 of FIG. 2 is achieved by having third selective coupler 166 and seventh selective coupler 174 in an engaged configuration and first selective coupler 162, second selective coupler 164, fourth selective coupler 168, fifth selective coupler 170, and sixth selective coupler 172 in a disengaged configuration.

A second or subsequent reverse gear or speed ratio (shown as R2) in exemplary truth table 200 of FIG. 2 is achieved by having third selective coupler 166 and sixth selective coupler 172 in an engaged configuration and first selective coupler 162, second selective coupler 164, fourth selective coupler 168, fifth selective coupler 170, and seventh selective coupler 174 in a disengaged configuration. Therefore, when transitioning between the first reverse gear or speed ratio and the second reverse gear or speed ratio, seventh selective coupler 174 is placed in the disengaged configuration and sixth selective coupler 172 is placed in the engaged configuration.

A third or subsequent reverse gear or speed ratio (shown as R3) in exemplary truth table 200 of FIG. 2 is achieved by having third selective coupler 166 and fifth selective coupler 170 in an engaged configuration and first selective coupler 162, second selective coupler 164, fourth selective coupler 168, sixth selective coupler 172, and seventh selective coupler 174 in a disengaged configuration. Therefore, when transitioning between the second reverse gear or speed ratio and the third reverse gear or speed ratio, sixth selective coupler 172 is placed in the disengaged configuration and fifth selective coupler 170 is placed in the engaged configuration.

A fourth or subsequent reverse gear or speed ratio (shown as R4) in exemplary truth table 200 of FIG. 2 is achieved by having second selective coupler 164 and seventh selective coupler 174 in an engaged configuration and first selective coupler 162, third selective coupler 166, fourth selective coupler 168, fifth selective coupler 170, and sixth selective coupler 172 in a disengaged configuration. Therefore, when transitioning between the third reverse gear or speed ratio and the fourth reverse gear or speed ratio, third selective coupler 166 and fifth selective coupler 170 are placed in the disengaged configuration and second selective coupler 164 and seventh selective coupler 174 are placed in the engaged configuration.

A fifth or subsequent reverse gear or speed ratio (shown as R5) in exemplary truth table 200 of FIG. 2 is achieved by having second selective coupler 164 and sixth selective coupler 172 in an engaged configuration and first selective coupler 162, third selective coupler 166, fourth selective coupler 168, fifth selective coupler 170, and seventh selective coupler 174 in a disengaged configuration. Therefore, when transitioning between the fourth reverse gear or speed ratio and the fifth reverse gear or speed ratio, seventh selective coupler 174 is placed in the disengaged configuration and sixth selective coupler 172 is placed in the engaged configuration.

In the illustrated embodiment, various combinations of two of the available selective couplers 162-174 are engaged for each of the illustrated forward speed ratios and reverse speed ratios. Additional combinations of engaged selective couplers 162-174 may provide a brake mode wherein one of input 102 and output 104 is locked. In embodiments, fewer forward speed ratios and/or fewer reserve speed ratios of the above examples are used.

Figure 3:
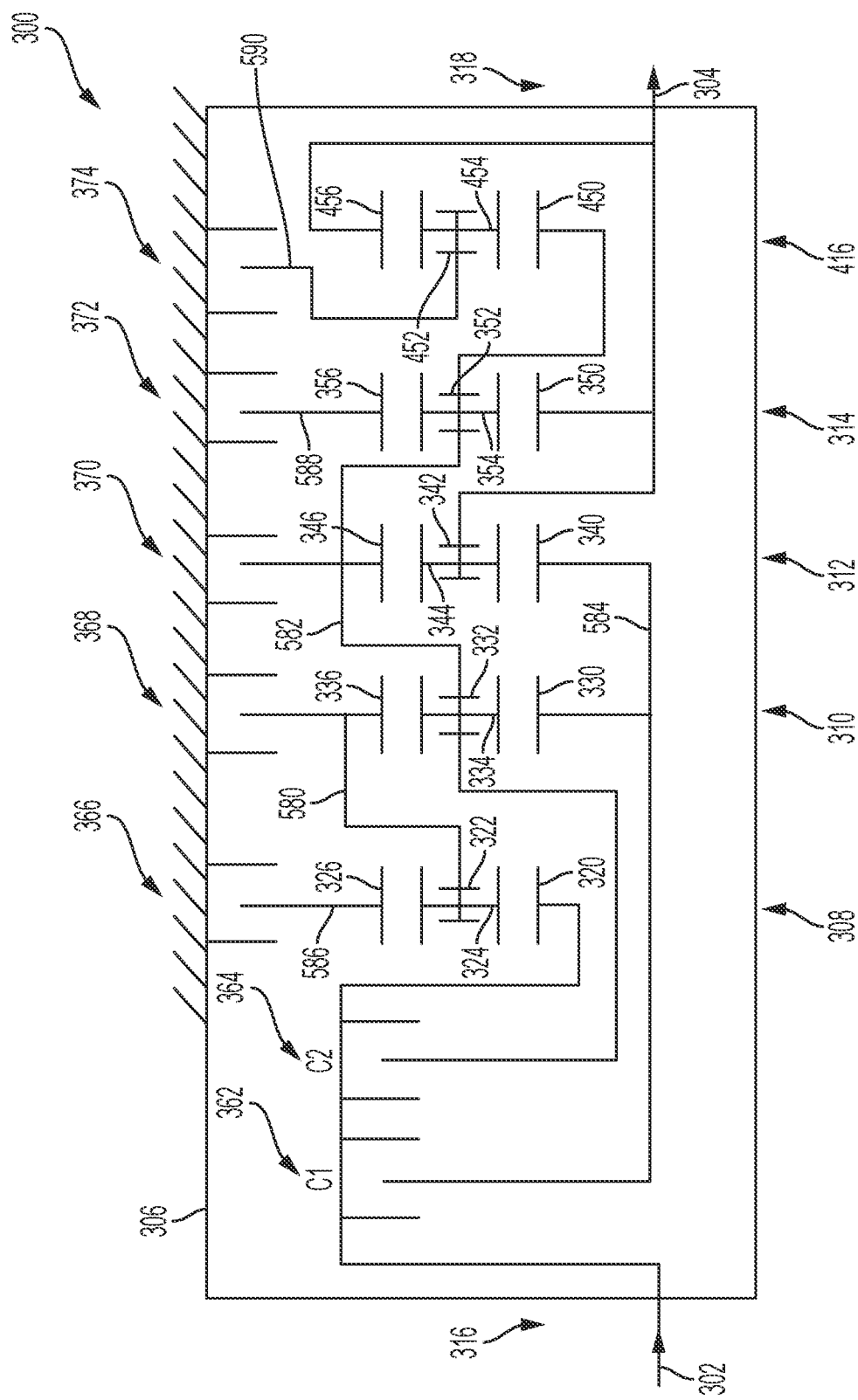
FIG. 3 is a diagrammatic view of another exemplary multi-speed transmission including five planetary gearsets and seven selective couplers.

Referring to FIG. 3, another exemplary multi-speed transmission 300 is illustrated. Multi-speed transmission 300 includes an input member 302 and an output member 304. Each of input member 302 and output member 304 is rotatable relative to at least one stationary member 306. An exemplary input member 302 is an input shaft or other suitable rotatable component. An exemplary output member 304 is an output shaft or other suitable rotatable component. An exemplary stationary member 306 is a housing of multi-speed transmission 300. The housing may include several components coupled together.

Multi-speed transmission 300 includes a plurality of planetary gearsets, illustratively a first planetary gearset 308, a second planetary gearset 310, a third planetary gearset 312, a fourth planetary gearset 314, and a fifth planetary gearset 416. In one embodiment, additional planetary gearsets may be included. Further, although first planetary gearset 308, second planetary gearset 310, third planetary gearset 312, fourth planetary gearset 314, and fifth planetary gearset 416 are illustrated as simple planetary gearsets, it is contemplated that compound planetary gearsets may be included in some embodiments.

In one embodiment, multi-speed transmission 300 is arranged as illustrated in FIG. 3, with first planetary gearset 308 positioned between a first location or end 316 at which input member 302 enters stationary member 306 and second planetary gearset 310, second planetary gearset 310 is positioned between first planetary gearset 308 and third planetary gearset 312, third planetary gearset 312 is positioned between second planetary gearset 310 and fourth planetary gearset 314, fourth planetary gearset 314 is positioned between third planetary gearset 312 and fifth planetary gearset 416, and fifth planetary gearset 416 is positioned between fourth planetary gearset 314 and a second location or end 318 at which output member 304 exits stationary member 306. In alternative embodiments, first planetary gearset 308, second planetary gearset 310, third planetary gearset 312, fourth planetary gearset 314, and fifth planetary gearset 416 are arranged in any order relative to location 316 and location 318. In the illustrated embodiment of FIG. 3, each of first planetary gearset 308, second planetary gearset 310, third planetary gearset 312, fourth planetary gearset 314, and fifth planetary gearset 416 are axially aligned. In one example, input member 302 and output member 304 are also axially aligned with first planetary gearset 308, second planetary gearset 310, third planetary gearset 312, fourth planetary gearset 314, and fifth planetary gearset 416. In alternative embodiments, one or more of input member 302, output member 304, first planetary gearset 308, second planetary gearset 310, third planetary gearset 312, fourth planetary gearset 314, and fifth planetary gearset 416 are offset and not axially aligned with the remainder.

First planetary gearset 308 includes a sun gear 320, a planet carrier 322 supporting a plurality of planet gears 324, and a ring gear 326. Second planetary gearset 310 includes a sun gear 330, a planet carrier 332 supporting a plurality of planet gears 334, and a ring gear 336. Third planetary gearset 312 includes a sun gear 340, a planet carrier 342 supporting a plurality of planet gears 344, and a ring gear 346. Fourth planetary gearset 314 includes a sun gear 350, a planet carrier 352 supporting a plurality of planet gears 354, and a ring gear 356. Fifth planetary gearset 416 includes a sun gear 450, a planet carrier 452 supporting a plurality of planet gears 454, and a ring gear 456.

Multi-speed transmission 300 further includes a plurality of selective couplers, illustratively a first selective coupler 362, a second selective coupler 364, a third selective coupler 366, a fourth selective coupler 368, a fifth selective coupler 370, a sixth selective coupler 372, and a seventh selective coupler 374. In the illustrated embodiment, first selective coupler 362 and second selective coupler 364 are clutches and third selective coupler 366, fourth selective coupler 368, fifth selective coupler 370, sixth selective coupler 372, and seventh selective coupler 374 are brakes. The axial locations of the clutches and brakes relative to the plurality of planetary gearsets may be altered from the illustrated axial locations. In alternative embodiments, any number of clutches and brakes may be used.

Multi-speed transmission 300 includes several components that are illustratively shown as being fixedly coupled together. Input member 302 is fixedly coupled to sun gear 320 of first planetary gearset 308. Output member 304 is fixedly coupled to planet carrier 342 of third planetary gearset 312, sun gear 350 of fourth planetary gearset 314, and ring gear 456 of fifth planetary gearset 416. Ring gear 336 of second planetary gearset 310 and planet carrier 322 of first planetary gearset 308 are fixedly coupled together. Planet carrier 332 of second planetary gearset 310, ring gear 346 of third planetary gearset 312, planet carrier 352 of fourth planetary gearset 314, and sun gear 450 of fifth planetary gearset 416 are fixedly coupled together. Sun gear 330 of second planetary gearset 310 is fixedly coupled to sun gear 340 of third planetary gearset 312. In alternative embodiments, one or more of the components fixedly coupled together are selectively coupled together through one or more selective couplers.

Multi-speed transmission 300 may be described as having eight interconnectors. Input member 302 is a first interconnector that both provides input torque to multi-speed transmission 300 and fixedly couples sun gear 320 of first planetary gearset 308 to first selective coupler 362 and to second selective coupler 364. Output member 304 is a second interconnector that provides output torque from multi-speed transmission 300 and fixedly couples planet carrier 342 of third planetary gearset 312 and sun gear 350 of fourth planetary gearset 314 to ring gear 456 of fifth planetary gearset 416. A third interconnector 580 fixedly couples ring gear 336 of second planetary gearset 310 to planet carrier 322 of first planetary gearset 308. Third interconnector 580 is further fixedly coupled to fourth selective coupler 368. A fourth interconnector 582 fixedly couples planet carrier 332 of second planetary gearset 310, ring gear 346 of third planetary gearset 312, planet carrier 352 of fourth planetary gearset 314, and sun gear 450 of fifth planetary gearset 416. Fourth interconnector 582 is further fixedly coupled to second selective coupler 364 and to fifth selective coupler 370. A fifth interconnector 584 fixedly couples sun gear 330 of second planetary gearset 310 to sun gear 340 of third planetary gearset 312. Fifth interconnector 584 is further fixedly coupled to first selective coupler 362. Sixth interconnector 586 fixedly couples ring gear 326 of first planetary gearset 308 to third selective coupler 366. Seventh interconnector 588 fixedly couples ring gear 356 of fourth planetary gearset 314 to sixth selective coupler 372. Eighth interconnector 590 fixedly couples planet carrier 452 of fifth planetary gearset 416 to seventh selective coupler 374.

Multi-speed transmission 300 further includes several components that are illustratively shown as being selectively coupled together through selective couplers. First selective coupler 362, when engaged, fixedly couples sun gear 320 of first planetary gearset 308 to sun gear 330 of second planetary gearset 310 and sun gear 340 of third planetary gearset 312. When first selective coupler 362 is disengaged, sun gear 320 of first planetary gearset 308 may rotate relative to sun gear 330 of second planetary gearset 310 and sun gear 340 of third planetary gearset 312.

Second selective coupler 364, when engaged, fixedly couples sun gear 320 of first planetary gearset 308 to planet carrier 332 of second planetary gearset 310, ring gear 346 of third planetary gearset 312, planet carrier 352 of fourth planetary gearset 314, and sun gear 450 of fifth planetary gearset 416. When second selective coupler 364 is disengaged, sun gear 320 of first planetary gearset 308 may rotate relative to planet carrier 332 of second planetary gearset 310, ring gear 346 of third planetary gearset 312, planet carrier 352 of fourth planetary gearset 314, and sun gear 450 of fifth planetary gearset 416.

Third selective coupler 366, when engaged, fixedly couples ring gear 326 of first planetary gearset 308 to stationary member 306. When third selective coupler 366 is disengaged, ring gear 326 of first planetary gearset 308 may rotate relative to stationary member 306.

Fourth selective coupler 368, when engaged, fixedly couples planet carrier 322 of first planetary gearset 308 and ring gear 336 of second planetary gearset 310 to stationary member 306. When fourth selective coupler 368 is disengaged, planet carrier 322 of first planetary gearset 308 and ring gear 336 of second planetary gearset 310 may rotate relative to stationary member 306.

Fifth selective coupler 370, when engaged, fixedly couples planet carrier 332 of second planetary gearset 310, ring gear 346 of third planetary gearset 312, planet carrier 352 of fourth planetary gearset 314, and sun gear 450 of fifth planetary gearset 416 to stationary member 306. When fifth selective coupler 370 is disengaged, planet carrier 332 of second planetary gearset 310, ring gear 346 of third planetary gearset 312, planet carrier 352 of fourth planetary gearset 314, and sun gear 450 of fifth planetary gearset 416 may rotate relative to stationary member 306.

Sixth selective coupler 372, when engaged, fixedly couples ring gear 356 of fourth planetary gearset 314 to stationary member 306. When sixth selective coupler 372 is disengaged, ring gear 356 of fourth planetary gearset 314 may rotate relative to stationary member 306.

Seventh selective coupler 374, when engaged, fixedly couples planet carrier 452 of fifth planetary gearset 416 to stationary member 306. When seventh selective coupler 374 is disengaged, planet carrier 452 of fifth planetary gearset 416 may rotate relative to stationary member 306.

By engaging various combinations of first selective coupler 362, second selective coupler 364, third selective coupler 366, fourth selective coupler 368, fifth selective coupler 370, sixth selective coupler 372, and seventh selective coupler 374, additional components of multi-speed transmission 300 may be fixedly coupled together.

The plurality of planetary gearsets and the plurality of selective couplers of multi-speed transmission 300 may be interconnected in various arrangements to provide torque from input member 302 to output member 304 in at least nine forward gear or speed ratios and at least four reverse gear or speed ratios. Referring to FIG. 4, an exemplary truth table 400 is shown that provides the state of each of first selective coupler 362, second selective coupler 364, third selective coupler 366, fourth selective coupler 368, fifth selective coupler 370, sixth selective coupler 372, and seventh selective coupler 374 for nine different forward gear or speed ratios and four reverse gear or speed ratio. Each row corresponds to a given interconnection arrangement for multi-speed transmission 300. The first column provides the gear range (forward gears and reverse gears). The second column provides the gear ratio between the input member 302 and the output member 304. The remaining columns illustrate which ones of the selective couplers 362-374 are engaged ("X" indicates engaged) and which ones of selective couplers 362-374 are disengaged ("(blank)" indicates disengaged). FIG. 4 is only one example of any number of truth tables possible for achieving at least nine forward ratios and four reverse ratios.

In one embodiment, to place multi-speed transmission 300 in neutral, all of first selective coupler 362, second selective coupler 364, third selective coupler 366, fourth selective coupler 368, fifth selective coupler 370, sixth selective coupler 372, and seventh selective coupler 374 are in the disengaged configuration. One or more of first selective coupler 362, second selective coupler 364, third selective coupler 366, fourth selective coupler 368, fifth selective coupler 370, sixth selective coupler 372, and seventh selective coupler 374 may remain engaged in neutral as long as the combination of first selective coupler 362, second selective coupler 364, third selective coupler 366, fourth selective coupler 368, fifth selective coupler 370, sixth selective coupler 372, and seventh selective coupler does not transmit torque from input member 302 to output member 304.

A first forward ratio (shown as 1st) in truth table 400 of FIG. 4 is achieved by having first selective coupler 362 and seventh selective coupler 374 in an engaged configuration and second selective coupler 364, third selective coupler 366, fourth selective coupler 368, fifth selective coupler 370, and sixth selective coupler 372 in a disengaged configuration.

A second or subsequent forward ratio (shown as 2nd) in truth table 400 of FIG. 4 is achieved by having first selective coupler 362 and fifth selective coupler 370 in an engaged configuration and second selective coupler 364, third selective coupler 366, fourth selective coupler 368, sixth selective coupler 372, and seventh selective coupler 374 in a disengaged configuration. Therefore, when transitioning between the first forward ratio and the second forward ratio, seventh selective coupler 374 is placed in the disengaged configuration and fifth selective coupler 370 is placed in the engaged configuration.

A third or subsequent forward ratio (shown as 3rd) in truth table 400 of FIG. 4 is achieved by having first selective coupler 362 and sixth selective coupler 372 in an engaged configuration and second selective coupler 364, third selective coupler 366, fourth selective coupler 368, fifth selective coupler 370, and seventh selective coupler 374 in a disengaged configuration. Therefore, when transitioning between the second forward ratio and the third forward ratio, fifth selective coupler 370 is placed in the disengaged configuration and sixth selective coupler 372 is placed in the engaged configuration.

A fourth or subsequent forward ratio (shown as 4th) in truth table 400 of FIG. 4 is achieved by having first selective coupler 362 and fourth selective coupler 368 in an engaged configuration and second selective coupler 364, third selective coupler 366, fifth selective coupler 370, sixth selective coupler 372, and seventh selective coupler 374 in a disengaged configuration. Therefore, when transitioning between the third forward ratio and the fourth forward ratio, sixth selective coupler 372 is placed in the disengaged configuration and fourth selective coupler 368 is placed in the engaged configuration.

A fifth or subsequent forward ratio (shown as 5th) in truth table 400 of FIG. 4 is achieved by having first selective coupler 362 and third selective coupler 366 in an engaged configuration and second selective coupler 364, fourth selective coupler 368, fifth selective coupler 370, sixth selective coupler 372, and seventh selective coupler 374 in a disengaged configuration. Therefore, when transitioning between the fourth forward ratio and the fifth forward ratio, fourth selective coupler 368 is placed in the disengaged configuration and third selective coupler 366 is placed in the engaged configuration.

A sixth or subsequent forward ratio (shown as 6th) in truth table 400 of FIG. 4 is achieved by having first selective coupler 362 and second selective coupler 364 in an engaged configuration and third selective coupler 366, fourth selective coupler 368, fifth selective coupler 370, sixth selective coupler 372, and seventh selective coupler 374 in a disengaged configuration. Therefore, when transitioning between the fifth forward ratio and the sixth forward ratio, third selective coupler 366 is placed in the disengaged configuration and second selective coupler 364 is placed in the engaged configuration.

A seventh or subsequent forward ratio (shown as 7th) in truth table 400 of FIG. 4 is achieved by having second selective coupler 364 and third selective coupler 366 in an engaged configuration and first selective coupler 362, fourth selective coupler 368, fifth selective coupler 370, sixth selective coupler 372, and seventh selective coupler 374 in a disengaged configuration. Therefore, when transitioning between the sixth forward ratio and the seventh forward ratio, first selective coupler 362 is placed in the disengaged configuration and third selective coupler 366 is placed in the engaged configuration.

An eighth or subsequent forward ratio (shown as 8th) in truth table 400 of FIG. 4 is achieved by having second selective coupler 364 and fourth selective coupler 368 in an engaged configuration and first selective coupler 362, third selective coupler 366, fifth selective coupler 370, sixth selective coupler 372, and seventh selective coupler 374 in a disengaged configuration. Therefore, when transitioning between the seventh forward ratio and the eighth forward ratio, third selective coupler 366 is placed in the disengaged configuration and fourth selective coupler 368 is placed in the engaged configuration.

A ninth or subsequent forward ratio (shown as 9th) in truth table 400 of FIG. 4 is achieved by having second selective coupler 364 and sixth selective coupler 372 in an engaged configuration and first selective coupler 362, third selective coupler 366, fourth selective coupler 368, fifth selective coupler 370, and seventh selective coupler 374 in a disengaged configuration. Therefore, when transitioning between the eighth forward ratio and the ninth forward ratio, fourth selective coupler 368 is placed in the disengaged configuration and sixth selective coupler 372 is placed in the engaged configuration.

The present disclosure contemplates that downshifts follow the reverse sequence of the corresponding upshift (as described above). Further, several power-on skip-shifts that are single-transition are possible (e.g. from 1st up to 3rd, from 3rd down to 1st, from 3rd up to 5th, and from 5th down to 3rd).

A first reverse gear or speed ratio (shown as R1) in exemplary truth table 400 of FIG. 4 is achieved by having third selective coupler 366 and seventh selective coupler 374 in an engaged configuration and first selective coupler 362, second selective coupler 364, fourth selective coupler 368, fifth selective coupler 370, and sixth selective coupler 372 in a disengaged configuration.

A second or subsequent reverse gear or speed ratio (shown as R2) in exemplary truth table 400 of FIG. 4 is achieved by having third selective coupler 366 and fifth selective coupler 370 in an engaged configuration and first selective coupler 362, second selective coupler 364, fourth selective coupler 368, sixth selective coupler 372, and seventh selective coupler 374 in a disengaged configuration. Therefore, when transitioning between the first reverse gear or speed ratio and the second reverse gear or speed ratio, seventh selective coupler 374 is placed in the disengaged configuration and fifth selective coupler 370 is placed in the engaged configuration.

A third or subsequent reverse gear or speed ratio (shown as R3) in exemplary truth table 400 of FIG. 4 is achieved by having third selective coupler 366 and sixth selective coupler 372 in an engaged configuration and first selective coupler 362, second selective coupler 364, fourth selective coupler 368, fifth selective coupler 370, and seventh selective coupler 374 in a disengaged configuration. Therefore, when transitioning between the second reverse gear or speed ratio and the third reverse gear or speed ratio, fifth selective coupler 370 is placed in the disengaged configuration and sixth selective coupler 372 is placed in the engaged configuration.

A fourth or subsequent reverse gear or speed ratio (shown as R4) in exemplary truth table 400 of FIG. 4 is achieved by having second selective coupler 364 and seventh selective coupler 374 in an engaged configuration and first selective coupler 362, third selective coupler 366, fourth selective coupler 368, fifth selective coupler 370, and sixth selective coupler 372 in a disengaged configuration. Therefore, when transitioning between the third reverse gear or speed ratio and the fourth reverse gear or speed ratio, third selective coupler 366 and sixth selective coupler 372 are placed in the disengaged configuration and second selective coupler 364 and seventh selective coupler 374 are placed in the engaged configuration.

In the illustrated embodiment, various combinations of two of the available selective couplers 362-374 are engaged for each of the illustrated forward speed ratios and reverse speed ratios. Additional combinations of engaged selective couplers 362-374 may provide a brake mode wherein one of input 302 and output 304 is locked. In embodiments, fewer forward speed ratios and/or fewer reserve speed ratios of the above examples are used.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:
   at least one stationary member;
   an input member rotatable relative to the at least one stationary member;
   a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, a fourth planetary gearset, and a fifth planetary gearset, the input member is fixedly coupled to the first gearset component of the first planetary gearset;
   an output member operatively coupled to the input member through the plurality of planetary gearsets and rotatable relative to the at least one stationary member, the output member is fixedly coupled to the second gearset component of the third planetary gearset, the first gearset component of the fourth planetary gearset, and the first gearset component of the fifth planetary gearset;
   a first interconnector which fixedly couples the second gearset component of the second planetary gearset, the third gearset component of the third planetary gearset, and the third gearset component of the fourth planetary gearset together;
   a second interconnector which fixedly couples the third gearset component of the second planetary gearset and the second gearset component of the first planetary gearset together;
   a third interconnector which fixedly couples the second gearset component of the fourth planetary gearset and the third gearset component of the fifth planetary gearset together;
   a fourth interconnector which fixedly couples the first gearset component of the second planetary gearset and the first gearset component of the third planetary gearset together; and
   a plurality of selective couplers, wherein the plurality of selective couplers includes:
      a first selective coupler which, when engaged, fixedly couples the input member and the first gearset component of the first planetary gearset to the first gearset component of the second planetary gearset and the first gearset component of the third planetary gearset;
      a second selective coupler which, when engaged, fixedly couples the input member and the first gearset component of the first planetary gearset to the second gearset component of the second planetary gearset, the third gearset component of the third planetary gearset, and the third gearset component of the fourth planetary gearset;
      a third selective coupler which, when engaged, fixedly couples the third gearset component of the first planetary gearset to the at least one stationary member;
      a fourth selective coupler which, when engaged, fixedly couples the second gearset component of the first planetary gearset and the third gearset component of the second planetary gearset to the at least one stationary member;
      a fifth selective coupler which, when engaged, fixedly couples the second gearset component of the second planetary gearset, the third gearset component of the third planetary gearset, and the third gearset component of the fourth planetary gearset to the at least one stationary member;
      a sixth selective coupler which, when engaged, fixedly couples the second gearset component of the fourth planetary gearset and the third gearset component of the fifth planetary gearset to the at least one stationary member; and
      a seventh selective coupler which, when engaged, fixedly couples the second gearset component of the fifth planetary gearset to the at least one stationary member.

2. The transmission of claim 1, wherein the at least one stationary member includes a housing, the housing having a first end and a second end, wherein
   the input member is accessible proximate the first end of the housing;
   the output member is accessible proximate the second end of the housing;
   the first planetary gearset is positioned between the first end of the housing and the second planetary gearset;
   the second planetary gearset is positioned between the first planetary gearset and the third planetary gearset;
   the third planetary gearset is positioned between the second planetary gearset and the fourth planetary gearset;

the fourth planetary gearset is positioned between the third planetary gearset and the fifth planetary gearset; and the fifth planetary gearset is positioned between the fourth planetary gearset and the second end of the housing.

3. The transmission of claim 1, wherein each of the first planetary gearset, the second planetary gearset, the third planetary gearset, the fourth planetary gearset, the fifth planetary gearset is a simple planetary gearset.

4. The transmission of claim 3, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier, the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

5. The transmission of claim 1, wherein the plurality of selective couplers are selectively engaged in a plurality of combinations to establish a plurality of forward speed ratios and a plurality of reverse speed ratios between the input member and the output member, each of the plurality of combinations having at least two of the plurality of selective couplers engaged.

6. The transmission of claim 5, wherein in each combination only two of the plurality of selective couplers are engaged.

7. The transmission of claim 1, wherein the plurality of selective couplers are selectively engaged to establish:
a first forward speed ratio wherein the first selective coupler and the seventh selective coupler are engaged;
a second forward speed ratio wherein the first selective coupler and the sixth selective coupler are engaged;
a third forward speed ratio wherein the first selective coupler and the fifth selective coupler are engaged;
a fourth forward speed ratio wherein the first selective coupler and the fourth selective coupler are engaged;
a fifth forward speed ratio wherein the first selective coupler and the third selective coupler are engaged;
a sixth forward speed ratio wherein the first selective coupler and the second selective coupler are engaged;
a seventh forward speed ratio wherein the second selective coupler and the third selective coupler are engaged;
an eighth forward speed ratio wherein the second selective coupler and the fourth selective coupler are engaged;
a first reverse speed ratio wherein the third selective coupler and the seventh selective coupler are engaged;
a second reverse speed ratio wherein the third selective coupler and the sixth selective coupler are engaged;
a third reverse speed ratio wherein the third selective coupler and the fifth selective coupler are engaged;
a fourth reverse speed ratio wherein the second selective coupler and the seventh selective coupler are engaged; and
a fifth reverse speed ratio wherein the second selective coupler and the sixth selective coupler are engaged.

8. A transmission comprising:
at least one stationary member;
an input member rotatable relative to the at least one stationary member;
a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, a fourth planetary gearset, and a fifth planetary gearset, the input member is fixedly coupled to the first gearset component of the first planetary gearset;
an output member operatively coupled to the input member through the plurality of planetary gearsets and rotatable relative to the at least one stationary member, the output member is fixedly coupled to the second gearset component of the third planetary gearset, the first gearset component of the fourth planetary gearset, and the third gearset component of the fifth planetary gearset;
a first interconnector which fixedly couples the third gearset component of the second planetary gearset and the second gearset component of the first planetary gearset together;
a second interconnector which fixedly couples the second gearset component of the second planetary gearset, the third gearset component of the third planetary gearset, the second gearset component of the fourth planetary gearset, and the first gearset component of the fifth planetary gearset together;
a third interconnector which fixedly couples the first gearset component of the second planetary gearset and the first gearset component of the third planetary gearset together; and
a plurality of selective couplers, wherein the plurality of selective couplers includes:
a first selective coupler which, when engaged, fixedly couples the input member and the first gearset component of the first planetary gearset to the first gearset component of the second planetary gearset and the first gearset component of the third planetary gearset;
a second selective coupler which, when engaged, fixedly couples the input member and the first gearset component of the first planetary gearset to the second gearset component of the second planetary gearset, the third gearset component of the third planetary gearset, the second gearset component of the fourth planetary gearset, and the first gearset component of the fifth planetary gearset;
a third selective coupler which, when engaged, fixedly couples the third gearset component of the first planetary gearset to the at least one stationary member;
a fourth selective coupler which, when engaged, fixedly couples the second gearset component of the first planetary gearset and the third gearset component of the second planetary gearset to the at least one stationary member;

a fifth selective coupler which, when engaged, fixedly couples the second gearset component of the second planetary gearset, the third gearset component of the third planetary gearset, the second gearset component of the fourth planetary gearset, and the first gearset component of the fifth planetary gearset to the at least one stationary member;

a sixth selective coupler which, when engaged, fixedly couples the third gearset component of the fourth planetary gearset to the at least one stationary member; and a seventh selective coupler which, when engaged, fixedly couples the second gearset component of the fifth planetary gearset to the at least one stationary member; and wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier, the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

9. The transmission of claim 8, wherein the at least one stationary member includes a housing, the housing having a first end and a second end, wherein the input member is accessible proximate the first end of the housing;

the output member is accessible proximate the second end of the housing;

the first planetary gearset is positioned between the first end of the housing and the second planetary gearset;

the second planetary gearset is positioned between the first planetary gearset and the third planetary gearset;

the third planetary gearset is positioned between the second planetary gearset and the fourth planetary gearset;

the fourth planetary gearset is positioned between the third planetary gearset and the fifth planetary gearset; and the fifth planetary gearset is positioned between the fourth planetary gearset and the second end of the housing.

10. The transmission of claim 8, wherein each of the first planetary gearset, the second planetary gearset, the third planetary gearset, the fourth planetary gearset, the fifth planetary gearset is a simple planetary gearset.

11. The transmission of claim 8, wherein the plurality of selective couplers are selectively engaged in a plurality of combinations to establish a plurality of forward speed ratios and a plurality of reverse speed ratios between the input member and the output member, each of the plurality of combinations having at least two of the plurality of selective couplers engaged.

12. The transmission of claim 11, wherein in each combination only two of the plurality of selective couplers are engaged.

13. The transmission of claim 8, wherein the plurality of selective couplers are selectively engaged to establish:

a first forward speed ratio wherein the first selective coupler and the seventh selective coupler are engaged;

a second forward speed ratio wherein the first selective coupler and the fifth selective coupler are engaged;

a third forward speed ratio wherein the first selective coupler and the sixth selective coupler are engaged;

a fourth forward speed ratio wherein the first selective coupler and the fourth selective coupler are engaged;

a fifth forward speed ratio wherein the first selective coupler and the third selective coupler are engaged;

a sixth forward speed ratio wherein the first selective coupler and the second selective coupler are engaged;

a seventh forward speed ratio wherein the second selective coupler and the third selective coupler are engaged;

an eighth forward speed ratio wherein the second selective coupler and the fourth selective coupler are engaged;

a ninth forward speed ratio wherein the second selective coupler and the sixth selective coupler are engaged;

a first reverse speed ratio wherein the third selective coupler and the seventh selective coupler are engaged;

a second reverse speed ratio wherein the third selective coupler and the fifth selective coupler are engaged;

a third reverse speed ratio wherein the third selective coupler and the sixth selective coupler are engaged; and a fourth reverse speed ratio wherein the second selective coupler and the seventh selective coupler are engaged.

* * * * *